June 6, 1933.  E. H. JOHNSON  1,912,374
EXTRUDING MACHINE
Filed April 5, 1932  2 Sheets-Sheet 1

Inventor
Edgar H. Johnson
By Wooster & Davis
Attorneys

June 6, 1933. E. H. JOHNSON 1,912,374
EXTRUDING MACHINE
Filed April 5, 1932 2 Sheets-Sheet 2

Inventor
Edgar H. Johnson
By Wooster & Davis
Attorneys

Patented June 6, 1933

1,912,374

UNITED STATES PATENT OFFICE

EDGAR H. JOHNSON, OF PUTNAM, CONNECTICUT

EXTRUDING MACHINE

Application filed April 5, 1932. Serial No. 603,299.

This invention relates to new and useful improvements in extruding machines and has for an object the providing of an improved drive for the worm or screw conveyor and the pressure booster of extruding machines such as are shown in my prior Patents Nos. 1,516,968 of November 25, 1924 and 1,595,470 of August 10, 1926.

I have illustrated my invention as applied to a wire covering machine, but I wish it to be distinctly understood that this device is not limited to use with wire covering machines as it is obvious it may be used in other types of devices where it is required that plastic material be fed or forced under high pressure, such as machines for extruding tubes, straining plastic compounds and so forth.

In wire covering machines and the like as disclosed in my patents above referred to, a suitable plastic compound is fed by means of a worm or screw conveyor to a pressure booster and by the booster to the extruding chamber of a die. The natures of the compounds used vary materially, and the volume delivery of the compounds by the worm or screw conveyor to the booster depends on the tenacity of the compound used and the softer and more plastic the compound the slower the action of the revolving worm will propel it forwardly to the booster.

Since the worm operates in a cylinder slow forward movement of the compound revolving with the worm in its grooves in contact with the walls of the cylinder heats the compound unduly and produces premature vulcanization of the mixture or compound, it being understood that the compound generally includes vulcanizing agents for the purpose of toughening or curing it in its finished form under the action of heat, such for example as a rubber composition extruded through a die onto a wire as it passes through the die to provide an insulating and protective covering.

To reduce to a minimum the frictional drag of the compound against the cylinder walls and in the grooves of the worm it is necessary to take the compound from the delivery end of the worm as fast as the worm delivers it. If the compound were allowed to build up from resistance at the delivery end of the worm, the result would be a slippage or ineffective propulsion of the compound by the worm as the pressure built up against it. This might continue to the extent of a complete retardation of the forward movement of the compound with the result that the compound would revolve with the worm against the cylinder walls with increasing frictional heat.

The pressure booster of my patents above referred to has a positive capacity relation to its speed, and if driven directly by the worm or screw conveyor must be designed to handle only the volume of that plastic compound to be used in the machine which the worm is most inefficient in feeding forwardly, as a greater booster capacity would result in a starving or lack of sufficient supply of compound at the booster since the worm would be unable to supply the booster to its capacity and such failure of the required supply would result in intermittent, unsteady delivery of the extruded product as well as defective work.

It is, therefore, another object of the present invention to provide for varying or adjusting the speed of the booster relative to that of the worm or conveyor to properly coordinate the operation of the two elements and they are driven at the proper relative speeds for most effective and efficient operation on the particular compound to be handled, whereby the compound will be steadily delivered by the worm to the booster without undue friction and heating and the booster will be driven at such speed as to give it the capacity for properly handling the volume of material being delivered to it. Thus the operation of the two elements is coordinated so that the compound delivered by the worm under all conditions is taken at low pressure into the booster and delivered from the high pressure side at the pressure, the speed and volume warranted.

The adjustment for the relative speeds for the worm and booster also permits speed adjustments to overcome inefficiency due to progressive wear of the gear elements in the booster.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Figures 1, 2:
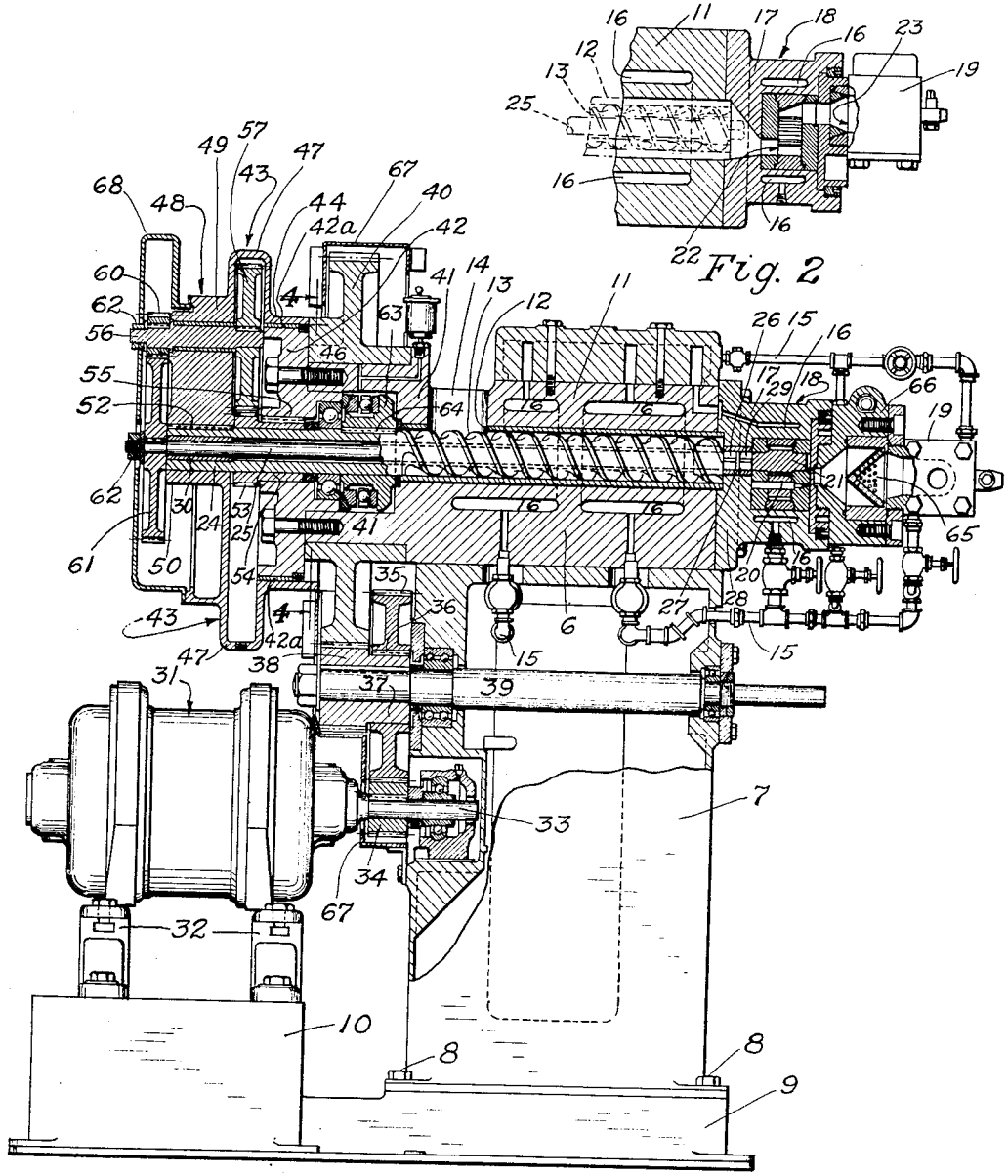
Fig. 1 is a view partly in elevation and partly in vertical section of a wire covering machine having the improved drive of the present invention applied thereto.
Fig. 2 is a detail sectional view taken at right angles to Fig. 2, the strainer element being omitted and the view showing the passage from the worm conveyor to the booster and from the booster to the extruding chamber of a die.
Figure 3:
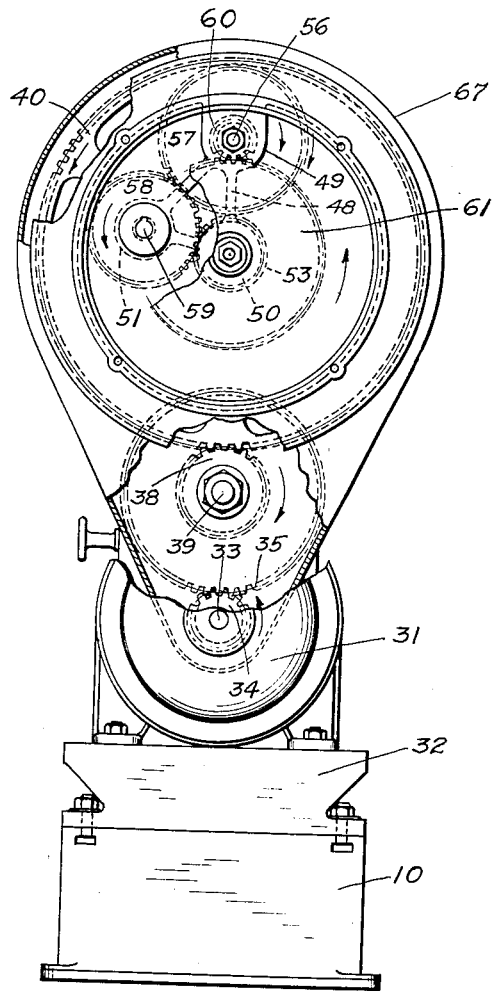
Fig. 3 is an end elevational view looking from the left in Fig. 1, parts being broken away to better illustrate details of construction.

The extruding machine to which the present invention is shown applied is, in many respects, similar to that shown in my patents above referred to and will be described in detail only in so far as such a description is necessary to a complete understanding of the present invention. As here shown, the machine includes a bed or frame 6 mounted on a suitable support as for example a stand 7 bolted or otherwise secured as at 8 to a base 9. Laterally, of the stand or upright 7 the base 9 includes a motor mounting or supporting block 10, the function of which will later be more fully described.

Frame 6 includes a cored cylinder 11 having a cylindrical bore lined as by means of a tube 12 and in which is mounted a worm or screw conveyor 13. A feed opening 14 is provided through a wall of the cylinder 11 and leads to one end of the conveyor 13. Suitable piping 15 leads to chambers 16 in the walls of the cylinder and in the walls of the casing 17 of a pressure booster member 18 as well as to the extruding chamber 19 of the die. This piping conducts cooling or heating fluid, such as water or steam to be used in heating or cooling the pastic material during its passage to the die to maintain it at the proper consistency for extruding and for vulcanizing or curing it at the proper time.

Plastic material fed to the worm 13 through the opening 14 is fed forwardly by the worm through the cylinder 12, due to rotation of the worm, and is delivered at low pressure to the pressure booster means 18 comprising a gear pump which may be of the same construction as the gear pump shown in my Patent 1,615,968 and including the housing or casing 17 and a feeding means or pumping means comprising a pair of rotating elements 20 and 21 having intermeshing ribs or projections similar to the teeth of spur gears. Of these elements, the element 21 is the driving element and the element 20 the driven element. The drive of the element 21 will later be described but here it may be stated that the plastic material is delivered from the worm 13 through a passageway 22 to the gear pump or pressure booster means where the pressure of the plastic material is increased and the material passes out of the booster through the passageway 23 to the extruding chamber 19 of the die.

The worm or the screw conveyor 13 as here disclosed is hollow and includes an extension or sleeve 24 projecting from one of its ends, and extending through the conveyor and its sleeve like extension is a shaft 25 at its inner end provided with a non-circular portion 26 received in a similarly shaped portion of a coupling member 27 rotatably mounted in an opening in a wall 28 of the casing 17. Into the other end of this coupling member projects a non-circular extension 29 rigid with the rotary feeding element 21 before referred to. It will thus be seen that any rotary movement imparted to the shaft 25 will be transmitted to the element 21 which in turn will drive the element 20 to pump the plastic coating material. It will be understood that the shaft 25 is rotatable in the worm 13 and may have a bearing 30 disposed in the sleeve-like extension 24 of the worm.

Means are provided for rotating the worm in a direction to have it feed the material forwardly through the cylindrical member 12 and deliver it to the pressure booster 18. This means includes a motor 31 which may be strapped or otherwise secured to supports 32 mounted on the block 10. The shaft 33 of the motor has keyed or otherwise secured thereto a pinion 34 meshing with and driving a gear 35 keyed as at 36 to the sleeve portion 37 of a pinion 38 mounted on a counter shaft 39 having suitable bearings in the stand or upright 7. Pinion 38 meshes with and drives a relatively large gear 40 rotatably mounted on an extension 41 of the cored cylinder 11 and secured in place thereon as by a plate-like member 42 bolted or otherwise secured to the extension 41 in a manner to provide a rigid part of the machine frame. From the foregoing, it will be seen that the motor 31 drives the gear 40.

Figure 4:
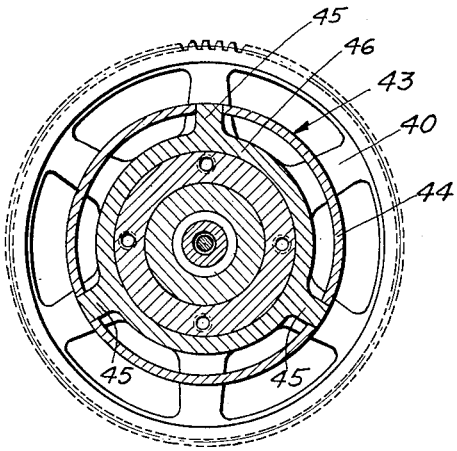
Fig. 4 is a sectional view taken substantially along the line 4—4 of Fig. 1.
Figure 5:
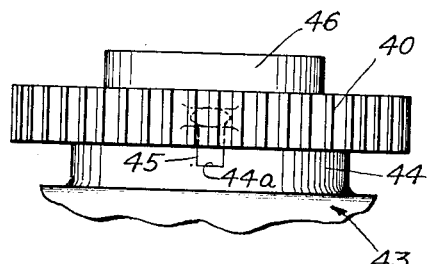
Fig. 5 is a plan view illustrating a detail of construction.

Secured to the gear 40 so as to rotate therewith is a housing 43 including a tubular neck portion 44 to which the gear 40 is rigidly secured as by means of radially extending lugs 45 rigid with the hub 46 of the gear, (See Figs. 4 and 5) and extending into recesses 44a in the edge of neck portion 44. In addition to the neck portion 44, the housing 43 includes an enlarged hollow portion 47 having secured thereto or formed therewith a somewhat triangularly shaped mounting bracket 48 at its corner portions including enlargements or bearing portions 49, 50 and 51. The bearing portion 50 of the bracket member 48 of the housing 43 is secured to the sleeve or extension 24 of the worm 13 as by a key 52 whereby as the housing rotates with the gear 40 the worm or screw conveyor will also be rotated in a manner to feed the plastice compound toward the pressure booster. The neck portion 44 embraces a bearing 42a on the member 42 on which the housing 43 rotates. This bearing preferably includes a bushing as shown.

Within the hollow portion 47 of the housing 43 a pinion 53 is disposed about the extension 24 of the worm 13 and this pinion includes a sleeve-like portion 54 keyed as at 55 to the stationary plate like member 42 above referred to. It will, therefore, be understood that this pinion 53 does not rotate but is held stationary and that the sleeve 24 rotates within the pinion. In the bearing 49 of the bracket 48 is rotatably mounted a short shaft 56 and secured to the end of said shaft within the hollow portion 47 of the housing is a gear 57 meshing with a gear 58 secured on a short shaft 59 rotatably mounted in the bearing 51 of the bracket. This gear 58 in turn meshes with the stationary pinion 53 and it will thus be seen that a planetary gearing is provided, the gears 57 and 58 being carried around the pinion 53, and since the gear 58 is in mesh with this pinion 53 gear 58 and gear 57 will be rotated. The portion 47 of the housing may be partially filled with oil to lubricate the gears.

To the outer end of the shaft 56 is secured a pinion 60 adapted to be rotated as the gear 57 is rotated and this pinion 60 meshes with a gear 61 secured to the end of the shaft 25 beyond the bracket portion 48 of the housing 43. As the pinion 60 meshes with the gear 61 and is driven by the gear 57 it will be apparent that the shaft 25 will be rotated in a manner to operate the pressure booster 18. The pinion 60 and the gear 61 are secured to their respective shafts as by nuts 62 and these gears may be described as pick-off gears. As above suggested, it is very desirable that arrangement be made whereby the pressure booster may be driven at selected speeds relative to the worm 13. With the above described arrangement it will be apparent that gears 60 and 61 may be removed from their respective shafts and gears of a different ratio substituted whereby to increase or decrease the speed at which the booster is driven.

A suitable thrust bearing arrangement 63 may be provided for the worm or screw conveyor and may be keyed or otherwise secured to the sleeve or extension 24 thereof as at 64. Also, it will be understood that suitable bearings may be provided for the other shafts employed. In Fig. 2 the booster is shown as delivering directly to the extruding chamber 19 while in Fig. 1 a strainer element 65 within a housing 66 is shown as interposed between the pressure booster and the extruding chamber. A suitable gear casing 67 may be provided to enclose the gears 34, 35, 38 and 40 and a gear casing 68, removably mounted, may be provided to enclose the gears 60 and 61. While the casing 68 may be secured in place in any desired manner it is preferred that it be so secured as to be readily removable whereby the pick-off gears may be easily and quickly removed and replaced.

From the foregoing description it will be understood that the worm or screw conveyor is more efficient in feeding plastics of one consistency than in feeding plastics of other consistencies. If the pressure booster were to be driven at a constant speed, then its speed must be fixed to take care of the volume of material delivered by the worm when the worm is acting on that material which it conveys the least efficiently. Otherwise, when working on such material the booster would attempt to feed the material faster than it would receive the same and a void would be created with the result that portions of a wire fed through the die would be left exposed, or an extruded tube would be imperfect and the like. Since the volume capacity of the pressure booster is determined by the speed at which it is driven I have provided a means whereby this speed may be readily varied or adjusted to thereby adjust the capacity of the booster to the capacity of the worm for whatever material is being acted on. Moreover, this speed adjustment permits of adjustments to overcome inefficiency due to wear in the booster elements. Thus the operation of the screw feed and the booster can be coordinated so they are driven at the proper relative speeds for most effective and efficient operation on the particular compound to be handled.

Having thus set forth the nature of my invention, what I claim is:

1. An extruding machine including a cylinder, a screw conveyor in said cylinder and adapted to convey plastic material therethrough and discharge it therefrom, a pressure booster means arranged to receive material from said conveyor, said pressure booster having a capacity varying with its speed, an extruding die arranged to receive the material from the pressure booster, means to drive the conveyor, means to drive the pressure booster, and said means for driving the pressure booster including means whereby the capacity of the pressure booster may be varied to adapt the same for the handling of the conveyors delivery capacity of a particular plastic compound.

2. An extruding machine comprising a cylinder, a screw conveyor in said cylinder and adapted to convey plastic material therethrough and discharge it therefrom, said conveyor having a delivery capacity varying with different materials, a pressure booster means arranged to receive material from said conveyor, said pressure booster having a capacity varying with its speed, an extruding die arranged to receive the material from the pressure booster, means to drive the conveyor, a gear mechanism driven by the conveyor driving means and operating to drive the pressure booster, and said gear mechanism including pick-off gears whereby the speed of the pressure booster may be changed to adapt its capacity to the delivery capacity of the conveyor as the capacity of the conveyor varies in the handling of different plastic materials.

3. An extruding machine comprising a cylinder, a screw conveyor in said cylinder and adapted to convey plastic material therethrough and discharge it therefrom, said conveyor having a delivery capacity varying with different materials, a pressure booster means arranged to receive material from said conveyor, said pressure booster having a capacity varying with its speed, an extruding die arranged to receive the material from the pressure booster, means to drive the conveyor, a gear mechanism driven by the conveyor driving means and operating to drive the pressure booster, and said gear mechanism including means whereby the speed of the pressure booster may be changed to adapt its capacity to the delivery capacity of the conveyor as the capacity of the conveyor varies in the handling of different plastic materials.

4. An extruding machine including a cylinder, a hollow screw conveyor in said cylinder and adapted to convey plastic material and discharge it from the cylinder, said conveyor having a delivery capacity varying with different plastic materials, a pressure booster means arranged to receive material discharged by the conveyor, said pressure booster having a capacity varying with its speed, an extruding die arranged to receive material from the booster, means for driving the conveyor from one of its ends, said booster arranged at the opposite end of the conveyor, a shaft having bearing in said hollow conveyor and at one end coupled with said booster, means at the other end of the shaft for driving the same and thus the booster, and means whereby the drive of said shaft may be varied to adjust the speed of the booster to the rate of delivery of the conveyor.

5. An extruding machine including a cylinder, a hollow screw conveyor in said cylinder and adapted to convey plastic material and discharge it from the cylinder, said conveyor having a delivery capacity varying with different plastic materials, a pressure booster means arranged to receive material discharged by the conveyor, said pressure booster having a capacity varying with its speed, an extruding die arranged to receive material from the booster, means including a gear means for driving the conveyor from one of its ends, said booster arranged at the opposite end of the conveyor, a shaft extending through said hollow conveyor and at one end coupled with the booster, means at the other end of the shaft for driving the same and thus the booster, and said means comprising a gear train including a pair of pick-off gears whereby the drive of the shaft may be varied to adjust the speed of the booster to the rate of delivery of the conveyor.

6. An extruding machine including a cylinder, a hollow screw conveyor in said cylinder and adapted to convey plastic material and discharge it from the cylinder, said conveyor having a delivery capacity varying with different plastic materials, a pressure booster means arranged to receive material discharged by the conveyor, said pressure booster means having a capacity varying with its speed, an extruding die arranged to receive material from the booster, means including a gear means for driving the conveyor from one of its ends, said booster arranged at the opposite end of the conveyor, a shaft extending through said hollow conveyor and at one end coupled with the booster, means at the other end of the shaft for driving the same and thus the booster, and said means including a gear train including means to vary the drive of the shaft and thus adjust the speed of the booster to the rate of delivery of the conveyor.

7. An extruding machine including a cylinder, a hollow screw conveyor in said cylinder and adapted to convey plastic material and discharge it from the cylinder, said conveyor having a delivery capacity varying with different plastic materials, a pressure booster means arranged to receive material discharged by the conveyor, said pressure booster having a capacity varying with its speed, an extruding die arranged to receive material from the booster, means to drive the conveyor and booster at various relative speeds to adjust the booster to the rate of delivery of the conveyor, said means including a sleeve-like extension on one end of the conveyor, a shaft extending through the conveyor and coupled at one end with the booster, a driven gear concentric with said sleeve and shaft, a housing rotatable with said gear, a driving connection between said housing and sleeve whereby the conveyor is driven, a stationary pinion within the housing and concentric with said shaft, a gear rotatably mounted in and movable with the housing and meshing with said pinion, a short shaft rotatably mounted in and extending through a wall of the housing, a gear secured to said shaft within the housing and meshing with said gear to be rotated thereby, a pinion secured to said short shaft beyond the housing, said first shaft extending beyond the housing and in parallel relation to the short shaft, a gear secured to said first shaft beyond the housing and meshing with said pinion on the short shaft whereby the first shaft and booster are driven, and said gear and pinion beyond the housing being removable from their respective shafts whereby gears and pinions having different ratios may be substituted to adjust the speed of the booster to the rate of delivery of the conveyor.

8. An extruding machine including a screw conveyor for plastic material, a pressure booster mounted to receive the material from said conveyor, an extruding die mounted to receive the material from the pressure booster, connector means for driving the conveyor and the booster at different speeds, and said means including means whereby the relative speeds of the conveyor and booster may be adjusted to coordinate the operation of said elements for the particular compound being handled.

In testimony whereof I affix my signature.

EDGAR H. JOHNSON.